Aug. 7, 1956 L. A. COX 2,757,822
NUT HOPPER AND SELECTOR
Filed May 24, 1952 3 Sheets-Sheet 1
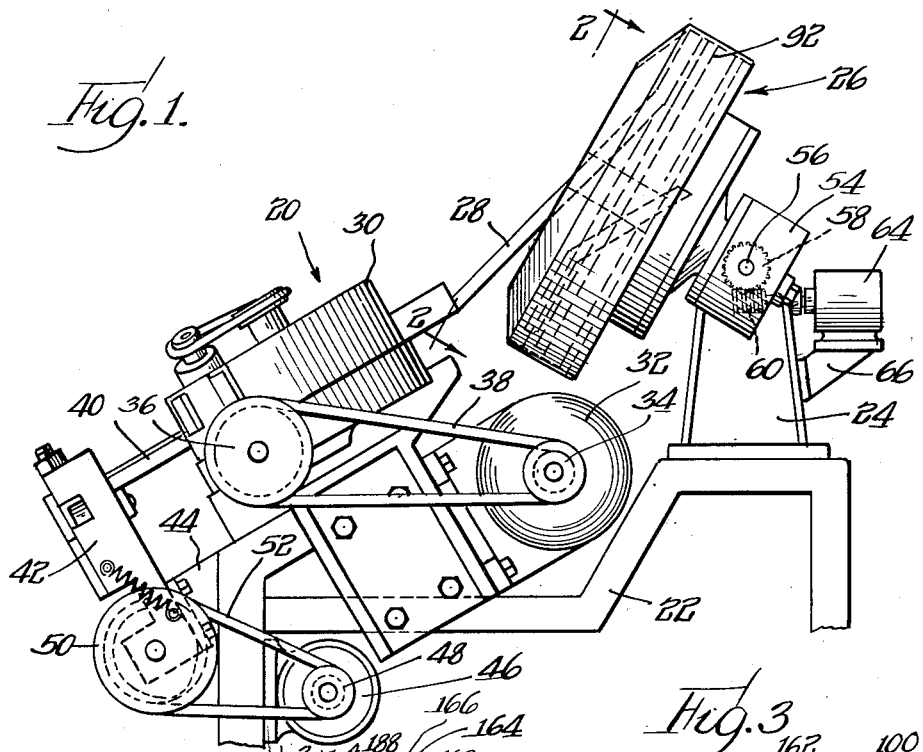
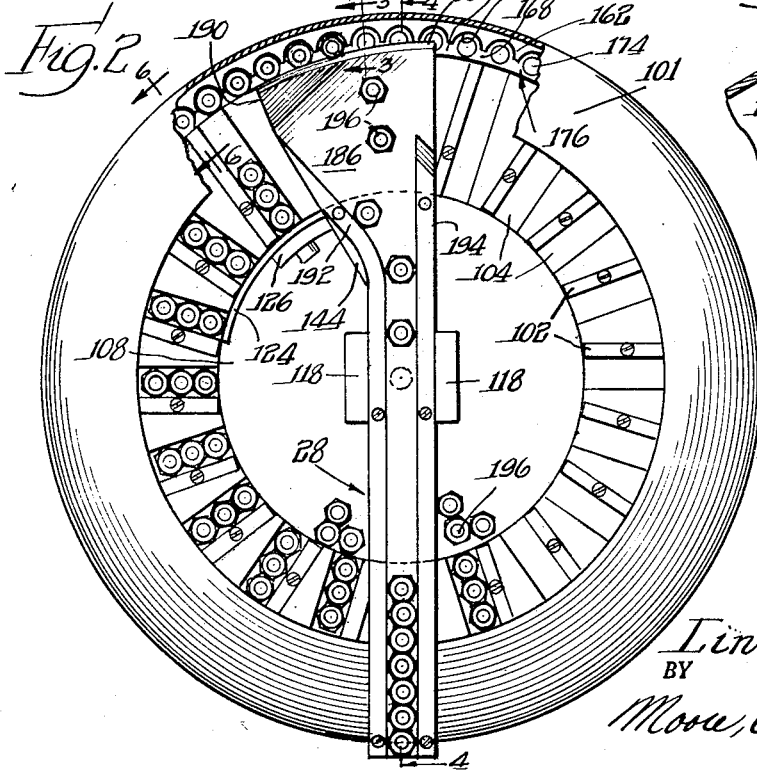
INVENTOR.
Linvell A. Cox
BY
Moore, Olson & Trexler
Attys.

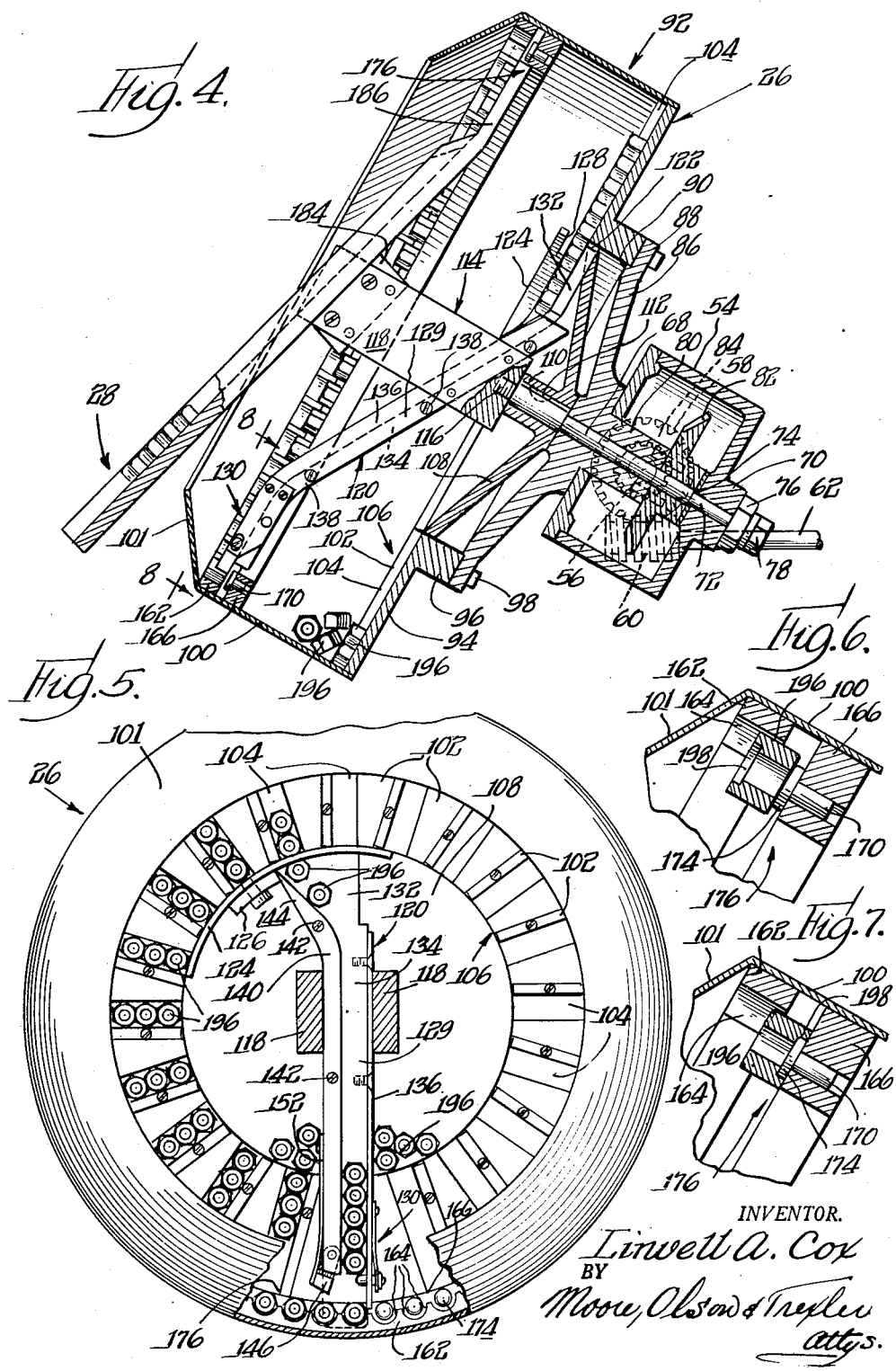

Aug. 7, 1956 L. A. COX 2,757,822
NUT HOPPER AND SELECTOR
Filed May 24, 1952 3 Sheets-Sheet 3
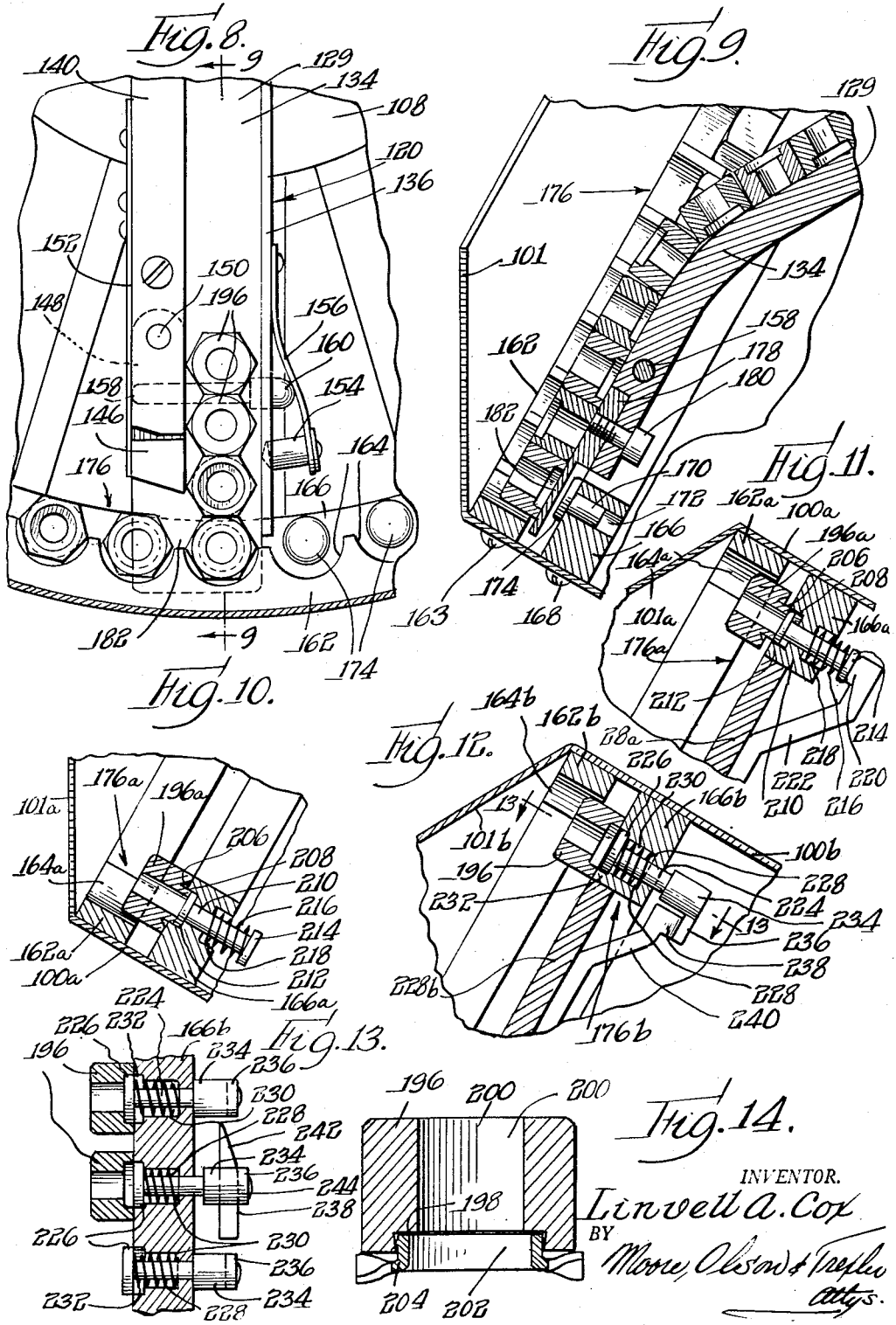
INVENTOR.
Linvell A. Cox
BY
Moore, Olson & Trexler
attys.

United States Patent Office 2,757,822
Patented Aug. 7, 1956

2,757,822

NUT HOPPER AND SELECTOR

Linvell A. Cox, Chicago, Ill., assignor to Illinois Tool Works, Chicago, Ill., a corporation of Illinois Application May 24, 1952, Serial No. 289,830

15 Claims. (Cl. 221—160)

This invention is concerned generally with a nut hopper and particularly with a nut hopper for handling nut elements having dissimilar ends.

In the production of preassembled nut element and lock washer units it is necessary to feed nut elements in succession from a random mass to an assembly station. Nut elements used in the production of such preassembled units are longitudinally asymmetrical, i. e. they have dissimilar ends. The washer receiving end of each such nut element is recessed to receive an outwardly flared central flange on a washer, or is provided with an axially extending central skirt adapted to fit into the central aperture of a washer and thereafter to be swaged outwardly to trap the washer on the nut element. Accordingly, the dissimilarly ended nut elements must not only be fed in succession from a random mass to an assembly station, they must be fed with all of their washer receiving ends oriented in a given direction.

It is therefore an object of this invention to provide an apparatus for feeding dissimilarly ended nut elements from a random mass with their washer receiving ends oriented in a given direction.

A further object of this invention is to provide an apparatus for selecting dissimilarly ended nut elements from a random mass with either end oriented in a given direction and for delivering those oriented in one direction to a chute for feeding to an assembly station, the nut elements oriented in the opposite direction being returned to the random mass.

An object of this invention is to provide a nut element hopper having a rotatable mechanism for picking up dissimilarly ended nuts from a random mass with either end oriented in a given direction and having a selector mechanism rotating with the pick up mechanism for separating nut elements oriented in one direction from those oriented in the opposite direction.

Other and further objects and advantages of the present invention will be understood from the following description when taken in connection with the accompanying drawings wherein:

Fig. 1 is an elevational view of a nut element and lock washer assembly machine utilizing a nut hopper constructed according to the principles of my invention;

Fig. 2 is a top view of the nut hopper taken substantially along the line 2—2 of Fig. 1;

Fig. 3 is a cross-sectional view through the hopper showing a selected nut element passing into the feeding chute and taken along the line 3—3 of Fig. 2;

Fig. 4 is a cross-sectional view of the nut hopper taken along the line 4—4 of Fig. 2;

Fig. 5 is a view similar to Fig. 2 with the delivery feed chute removed;

Fig. 6 is a sectional view taken along the line 6—6 of Fig. 2 showing an improperly oriented nut element;

Fig. 7 is a view similar to Fig. 6 showing a properly oriented nut element;

Fig. 8 is a detail view of the discharge end of the transfer chute and its cooperation with the selector ring as taken along the line 8—8 of Fig. 4;

Fig. 9 is a sectional view along the line 9—9 of Fig. 8;

Fig. 10 is a fragmentary view similar to Fig. 9 and showing the invention modified for use with a different type of nut element;

Fig. 11 is a view similar to Fig. 10 with the parts in a different position;

Fig. 12 is similar to Fig. 11 and showing a modified form of the apparatus;

Fig. 13 is a sectional view along the line 13—13 of Fig. 12; and

Fig. 14 is a sectional view of a preassembled nut element and lock washer.

Referring first to Fig. 1 for a general understanding of the applicability of my invention, there is shown a nut element and lock washer assembly machine 20 having a main frame 22. A pedestal 24 on the main frame supports a hopper 26 constructed according to the principles of my invention. A nut element feed chute 28 leads from the hopper 26 to a washer hopper 30 wherein the nut elements are aligned with washers in a manner not pertinent to the current invention. The washer hopper 30 is mounted on a portion of the main frame 22 and is driven by an electric motor 32 on the frame by the intermediary of pulleys 34 and 36 and a drive belt 38.

A chute 40 conveys aligned nut elements and washers from the washer hopper 30 to a telescoping mechanism 42 wherein the aligned nut elements and washers are permanently telescoped. The telescoping mechanism 42 is mounted on the main frame 22 by a bracket 44 and is driven by an electric motor 46 through the intermediary of pulleys 48 and 50 and a flexible belt 52.

The nut element hopper 26 is shown in detail in Figs. 2–13 and reference first should be had to Figs. 2–5. The hopper includes a fixed gear box 54 mounted on the aforementioned pedestal 24. A shaft 56 extending horizontally from the gear box 54 into an auxiliary gear box (not shown) is driven by a worm wheel 58 and a worm 60, the latter being fixed on a shaft 62 extending from a motor 64 fixed on a bracket 66 on the pedestal 24.

A fixed bolt 68 extends axially through the gear box 64 and through a hub 70 at the lower end of the gear box, the portion 72 of the bolt 68 which passes through the hub being of reduced diameter to provide a shoulder 74. The shoulder is pulled tightly against the inside of the gear box by a nut 76 threaded on the outer end thereof. A jam nut 78 locks the nut 76 in place.

A sleeve 80 surrounds the fixed bolt 68 within the gear box and extends outwardly therefrom. The sleeve is provided with a bevel gear 82 meshing with a bevel gear 84 on the horizontally extending shaft 56 and driven thereby. The outwardly extending end of the sleeve 80 is provided with an integral dished, or frusto-conical plate 86 having an outer ring-like, substantially flat peripheral flange 88 provided with an internal shoulder 90.

A rotatable casing 92 includes a substantially flat ring 94 having a cylindrical section 96 interfitting with the flange 88 and shoulder 90 of the plate 86 and secured thereon by means such as bolts 98. A sheet metal cylinder 100 having an inturned upper rim 101 is secured on the ring 94 in any suitable manner for rotation therewith. Strips or blocks 102 are secured on the upper surface of the ring 94 and define substantially radially extending slots or grooves 104 of sufficient width to accommodate the nut elements. The ring 94 and grooves 104 defined by the strips 102 serve to pick up or collect nut elements as will be set forth shortly and hereinafter will be referred to as a collector ring disc 106.

A fixed, frusto-conical central floor 108 fits over the fixed bolt 68 adjacent the plate 86 and is provided with a central, axially extending hub 110 keyed to the bolt at 112. A chute or track mounting member or block 114 threadedly receives the reduced outer end portion 116 of the bolt 68, the chute mounting member 114 and floor 108 thus being held in fixed position by the bolt 68.

The chute mounting member 114 is provided with upwardly extending arms 118 between which is fixed a transfer slide or chute 120. The transfer slide or chute 120 has an arcuate upper end 122 positioned substantially in contact with the collector ring and slightly below the collector ring for receiving nut elements which slide from the grooves 104 of the collector ring. The nut elements are held in the grooves by an arcuate plate or guard 124 secured in proximity to the inner edge of the collector ring substantially in the upper left quadrant thereof by a bracket 126 extending upwardly from the fixed floor 108. The upper or trailing edge of the guard 124 is undercut as at 128 to allow nut elements to slide from the collector ring on to the transfer chute 120.

The transfer chute 120 is straight throughout the major portion 129 of its length and the straight portion is diagonally disposed relative to the axis of the hopper 26. The transfer chute 120 is completed at its outer end by a portion 130 which is perpendicular to the axis of the hopper and at its inner end with a fanned out portion 132 providing the arcuate edge 122 and likewise perpendicular to the axis of the hopper.

The transfer chute 120 includes a flat-topped bottom strip 134 extending from end to end of the chute and providing the fanned out inner or receiving end 132. A wide strip 136 is held along a longitudinal edge of the straight section 129 and the outer section 130 by means such as screws 138 and extends above the bottom 134 to form a retaining wall for nut elements carried by the chute. The opposite longitudinal edge of the bottom 134 is provided with a retaining strip 140 extending from the inner end substantially to the outer end of the transfer chute and held in position by means such as screws 142 and has a tapered receiving end 144 curved along the fanned out portion 132 of the chute.

The outer or discharge end of the strip 140 is completed by a block 146 (best seen in Fig. 8) carried at the end of an arm 148 fitting in a slot in the strip 140 and pivoted therein at 150. A leaf spring 152 secured along the side of the strip 140 and bearing against the block 146 normally holds the block in position to form an extension of the strip 140 as shown in Fig. 8.

A plug 154 having a conical tip is carried at the outer end of the leaf spring 156 on the opposite side of the transfer chute from the leaf spring 152. The spring 156 tends to urge the plug 154 through an aperture in the side of retaining strip 136 into position to block nut elements passing through the chute. This tendency is normally overcome by a cross pin 158 having a rounded head 160 and extending through the bottom 129 between the spring 156 and the spring 152, the latter spring normally being strong enough to overcome the force of the spring 156 to hold the parts in the position shown in Fig. 8.

A positioning ring 162 (Figs. 2, 4, and 5) is suitably secured by suitable means such as screws 163 (Fig. 9) to the interior of the sheet metal cylinder 100 directly beneath the inturned edge 101 thereof and is provided with a plurality of spaced apart, inwardly opening semicircular recesses 164. The semicircular recesses 164 are of substantially the same diameter as the larger diameter or distance across corners of the nut elements to be handled by the hopper.

A pin ring 166 (Figs. 2, 4, 5, 8, and 9) is secured beneath the positioning ring by means such as screws 168 and is provided with pins 170 fixed in bores 172 concentric with the centers of the semicircular recesses 164 in the positioning ring 162. The pins are provided with enlarged, relatively flat heads 174 adapted to fit in the recesses or counterbores of recessed nut elements, but not into the central bores of the nut elements as will be apparent shortly. The positioning ring 162 and pin ring 166 rotate together and coact to perform a common function and hereinafter will be referred to generally as a selector ring 176.

Movement of nut elements from the transfer chute 134 into proper position in the selector ring 176 is insured by an insert 178 (Fig. 9) held in a relieved portion at the discharge end of the chute by a screw 180. The insert has a thin tongue 182 extending outwardly between the positioning ring 162 and pin ring 166 of the selector ring 176.

The aforementioned delivery chute 28 is secured near its upper end to a bracket 184 fixed between the arms 118 of the chute mounting member 114. The chute 28 is straight throughout most of its length and is channel-shaped in cross section slidingly to accommodate nut elements. The upper end 186 of the chute 28 is flat rather than channel shaped and is deflected somewhat from the plane of the chute to a position perpendicular to the axis of the hopper as best seen in Fig. 4. The upper end 186 of the chute further is fanned out as best may be seen in Fig. 2. The upper end 186 of the chute as best may be seen in Fig. 3 extends nearly into contact with the inner edge of the pin ring 166. The extreme edge 188 of the upper end (Figs. 2 and 3) is beveled and extends from the inner edge of the pin ring 166 progressively outwardly substantially to the inner edge of the positioning ring 162, thus overlying the inner half of each pin head 174. The leading or intercepting edge 190 of the upper end 186 is deflected slightly downwardly as shown in Fig. 2 so as to start substantially the level of the top surface of the pin ring 166 and to move progressively higher to a position slightly above the top surfaces of the pin heads 174. The side rails 192 and 194 providing the channel shape of the delivery chute 28 terminate a substantial distance short of the beveled edge 188. The rail 192 is curved to conform with the fanning out of the upper chute portion 186 and extends from the corner of the downwardly deflected portion 190. The rail 194 is provided with a beveled upper end to provide clearance for excess nut elements to prevent jams.

Operation

The particular embodiment of the hopper heretofore shown and described is adapted to handle nut elements 196 (Fig. 14) having central recesses or counterbores 198. The recesses 198 are larger in diameter than the central bores 200 and are larger in diameter at the interiors of the nut elements than at the outer ends or faces thereof to trap outwardly flared flanges 202 of twisted tooth lock washers 204.

A random mass of the nut elements 196 is dumped in the rotary head 92 of the hopper 26. Rotation of the collector ring 106 causes nut elements 196 to be picked up in the slots or grooves 104 as the slots or grooves move through the random mass of nut elements in the bottom of the hopper. Continued rotation of the collector ring 106 raises the nut elements from the mass relatively toward the top of the hopper. The arcuate guard 124 maintains the nut elements in the slots once they have been moved past the center of the hopper until the nut elements reach the undercut portion 128 of the guard at which time they slide from the grooves 104 on to the fanned out receiving end 132 of the transfer chute 120. The nut elements 196 then pass gravitationally down the transfer chute 120, any excess nut elements dropping off the side of the fanned out portion 132 above the upper end of the side strip 136. The nut elements pass from the discharge end 130 of the transfer chute to the selector ring 176 where they are received in the recesses 164 of the locator ring 162 directly above the pin heads 174. Any tendency for nut elements to jam at the discharge end of the chute is relieved by the block 146 which moves outwardly against the action of spring 152 to allow the jamming nut elements to drop back into the random mass in the bottom of the hopper. When this occurs the pin 158 is pushed back by the spring 156 which shifts the plug 154 beneath the row of nut elements 196 in the transfer chute until the jam clears, at which time the spring 152 pushes the block 146 back into its normal position and pushes the pin 158 against the spring 156 to retract the plug 154.

Nut elements 196 with their recesses 198 downwardly directed fit over the heads of the pins 174 whereas those which have their recesses upwardly directed merely rest on top of the pin heads 174. When the selector ring 176 has carried the nut elements above the center of the hopper such as to the position indicated by the line 6—6 in Fig. 2 and shown in Fig. 6, gravity tends to pull the nut elements from the ring. When the nut elements have their recesses upwardly directed as shown in Fig. 6, the nut elements merely rest on top of the pin heads and slide off under the force of gravity to drop back into the random mass in the bottom of the hopper where they again may be picked up by the collector ring 106. Nut elements 196 which are positioned with their recesses down fit over the pin heads 174 as shown in Fig. 7 and the pin heads prevent these nut elements from falling from the selector ring. The nut elements which are so held on the selector ring are carried upwardly by the ring until the beveled upper edge 188 of the downwardly deflected portion 190 of the fanned out upper end 186 of the delivery chute 28 engages beneath the lower edges of the nut elements. The progressive positioning of the edge 188 outwardly and upwardly over the pin heads 174 tips the nut elements 196 upwardly away from the pin heads as shown in Fig. 3 so that the nut elements slide away from the selector ring under the influence of gravity and down into the delivery chute 28.

Only nut elements having their recesses downwardly directed ever pass into the delivery chute 28 as the inverted nut elements have been dropped from the selector ring back into the random mass of nut elements in the hopper before the inverted nut elements could reach the receiving end of the delivery chute.

Modifications

Figs. 10 and 11 show fragmentary views of a modified form of hopper usable with nut elements 196a having axially extending skirts 206. The hopper is generally identical with that disclosed previously and similar numerals with the addition of the suffix "a" have been utilized to identify similar parts and thereby to obviate the necessity for extended description. The sole difference resides in the pin ring 166a which is provided with countersinks 208 adapted to receive the nut element skirts 206 as shown in Fig. 10. The countersinks 208 are of substantially the same diameter as the nut element skirts and communicate with bores in which pins 210 are slidably mounted. The pins 210 have enlarged, flat heads 212 of substantially the same diameter as the countersinks 208. The pins are provided at their opposite ends with enlarged stops 214 trapping compression springs 216 against the under side of the pin ring 166a and within counterbores 218 normally to maintain the pins in retracted position as shown in Fig. 10. Nut elements having their skirts downwardly directed interfit with the countersinks 208 and are thereby retained in the selector ring 176a until they reach the uppermost position of the ring 176a at which time a cam 220 carried on an arm 222 extending from the delivery chute 28a forces the pins 210 upwardly against the action of the springs 216 to bring the tops of the flat heads 212 level with the top surface of the pin wheel 166a. The nut elements 196a then slide on to the delivery chute 28a. Inverted nut elements, i. e. those with their skirts upwardly directed, fall off the selector ring under the influence of gravity before reaching the delivery chute 28a.

A longitudinally shiftable pin mechanism for use with recessed nuts 196 is shown in Figs. 12 and 13. In this modification most of the parts are identical with those first disclosed and similar parts are identified by similar numerals with the addition of the suffix "b" to eliminate the necessity of extended description. The only differences in this modification from the first embodiment described reside in the pin ring 166b which carries a plurality of longitudinally shiftable pins 224 having flat heads 226 normally held above the surface of the pin wheel as shown in the top and bottom positions of Fig. 13 by coil springs 228 trapped beneath the flat heads 226 and received in bores 230. Counterbores 232 provide space for retraction of the pin heads 226 as will be apparent shortly.

The ends of the pins opposite the heads 226 are provided with enlarged cylindrical portions 234 to limit outward movement of the pin heads under the influence of the springs 228. Each cylindrical portion 234 has a laterally projecting finger or cam follower 236, and a cam 238 is held by the upper end of the delivery chute 228b by a bracket arm 240. The cam is provided with an inclined portion 242 and a straight portion 244 for successively engaging the cam followers 236 momentarily to retract the pin heads 226.

Operation of the modified form of hopper shown in Figs. 12 and 13 is similar to that shown in the first embodiment including the feeding of the nut elements 196 into the selector ring 176b. The upwardly projecting pin heads 226 fit in the recesses of nut elements having their recesses downwardly directed as shown in the upper part of Fig. 13. Inverted nut elements merely rest on top of the pin heads and slide off under the force of gravity as in the first embodiment of the invention. As the nut elements are carried to the uppermost part of the hopper by rotation of the selector ring 176b, the cam followers 236 successively engage the cam 238 to retract the pins and pin heads 226 against the force of springs 228 as illustrated in Fig. 12 and in the central position of Fig. 13. The nut elements then slide from the selector ring 176b on to the delivery chute 28b under the influence of gravity. As will be seen in Figs. 12 and 13, the pin heads preferably are retracted to a position where their upper faces are in the same plane as the top face of the pin ring 166b or just slightly therebelow.

It will be seen that the invention disclosed herein makes it possible to feed dissimilarly ended nut elements rapidly and efficiently from a random mass to an assembly machine in proper position for assembly. Specifically, the nut elements are fed in succession with all of the washer receiving ends oriented in a given direction. Nut elements that are picked up from the random mass with the washer receiving ends oriented in the wrong direction are returned to the mass for further handling so that eventually they are fed from the hopper to the assembly mechanism. Defective nuts such as those having improperly formed washer receiving ends or off-center holes will be rejected by the selecting mechanism of the hopper and will never be fed from the hopper to the assembly mechanism.

Although three particular embodiments of my invention have been shown and described, it will be understood that these embodiments are by way of illustration and not by way of limitation. The invention includes all that which falls fairly within the spirit and scope of the appended claims.

I claim:

1. Apparatus for handling dissimilarly ended fastening elements comprising a pair of axially spaced apart rings coaxially mounted for rotation about an axis inclined to the vertical, the lowermost of said rings having a plurality of substantially radially extending grooves for picking up dissimilarly ended fastening elements from a random mass, the uppermost of said rings having means for retaining only such elements as are oriented in a predetermined direction, means for transferring fastening elements substantially diametrically from the lowermost of said rings to the uppermost of said rings, and means for rotating both of said rings to feed said fastening elements respectively to said transferring means and a delivery location, said lowermost ring moving through a random mass of fastening elements for picking up the same.

2. Apparatus for handling dissimilarly ended fastening elements comprising a pair of axially spaced apart rings coaxially mounted for rotation about an axis inclined to the vertical, the lowermost of said rings having a plurality of substantially radially extending grooves for picking up dissimilarly ended fastening elements from a random mass with either end oriented in a given direction, the uppermost of said rings having means for retaining only such elements as are oriented in a predetermined direction, a gravity feed chute for transferring fastening elements from the highest part of said lowermost ring to the lowest part of said uppermost ring, the highest part of said lowermost ring being higher than the lowest part of said uppermost ring, and means for rotating both of said rings to deliver fastening elements respectively to said gravity feed chute and to a delivery location, said lowermost ring moving through a random mass of fastening elements for picking up the same.

3. Apparatus for handling articles having a distinguishing end feature comprising a pair of axially spaced apart rings coaxially mounted for rotation about an axis inclined to the vertical, the lowermost of said rings having a plurality of substantially radially extending grooves for picking up articles from a random mass, the uppermost of said rings having structure complementary to the distinguishing end feature of said articles to retain articles each having a predetermined end oriented in a given direction, means for transferring articles from the lowermost of said rings to the uppermost of said rings, means for rotating both of said rings to deliver articles to said transferring means and to a delivery location respectively, said lowermost ring moving through a random mass of fastening elements for picking up the same, and means substantially at said delivery location for separating articles from the structure complementary to said distinguishing end feature.

4. Apparatus as set forth in claim 3 wherein the articles comprise recessed nut elements, the structure complementary thereto comprises a plurality of arcuately spaced protuberances, and the separating means comprises a knife edge overlying the uppermost ring and partially overlying said protuberances.

5. Apparatus as set forth in claim 3 wherein the articles comprise recessed nut elements, the structure complementary thereto comprises a plurality of arcuately spaced, retractably mounted protuberances, and the separating means comprises means for successively retracting said protuberances.

6. Apparatus as set forth in claim 3 wherein the articles comprises nut elements having axially extending skirts, the complementary structure comprises means defining a plurality of spaced apart recesses having members movably mounted in the bottoms thereof, and the separating means comprises means for moving said members upwardly momentarily to fill up said recesses in succession.

7. Apparatus as set forth in claim 3 wherein the articles comprise recessed nut elements, the complementary structure comprises a plurality of arcuately spaced protuberances, and the separating means comprises means for removing nut elements from the protuberances.

8. Apparatus as set forth in claim 3 wherein the articles comprise nut elements having distinguishing end features, the complementary structure includes a plurality of arcuately spaced, reciprocably mounted pins, and the separating means comprises means for successively reciprocating said pins.

9. Apparatus for handling dissimilarly ended fastening elements comprising a substantially cylindrical casing rotatable about an axis inclined to the vertical, a rotatable floor in said casing and having a plurality of substantially radially extending grooves for picking up nut elements from a random mass in said casing with either end oriented in a given direction, said floor being fixed to said casing for rotation therewith, a rotatable mechanism fixed to said casing for rotation therewith and spaced above said floor, said mechanism including means for retaining fastening elements having a predetermined end oriented in a given direction, a part of said floor being higher than a part of said rotatable mechanism, means for feeding fastening elements from said floor to said mechanism, and means for rotating said casing to deliver fastening elements from said floor to said feeding means and from said feeding means to a delivery location, said floor including the grooves moving through a random mass of fastening elements for picking up the same.

10. A hopper for handling dissimilarly ended nut elements comprising a ring having a plurality of substantially radial grooves for picking up nut elements with either end oriented in a given direction from a random mass and mounted for rotation about an axis inclined to the vertical, a gravity feed chute receiving nut elements with either end up from said ring at the upper position of said ring, selector means receiving nut elements from the feed chute and having a lower position which is lower than the upper position of said ring, said selector means including a pair of spaced apart ring sections axially spaced above said ring, the lowermost of said sections having structure complementary to a predetermined end of said nut elements and not to the other, the uppermost of said sections having a plurality of inwardly opening recesses for positioning nut elements with regard to said complementary structure, said gravity chute having a discharge edge positioned between said ring sections, and means for rotating said ring through a random mass of nut elements to deliver nut elements to said chute and for rotating said selector means for delivering properly oriented nut elements to a delivery location.

11. In a hopper for handling nut elements having a distinguishing end feature, the combination comprising rotatable means having structure complementary to said distinguishing end feature and mounted for rotation about an axis inclined to the vertical, a ring section coaxially mounted closely above said rotatable means and having inwardly opening recesses for positioning nut elements above said complementary structure, means for supplying nut elements to said recesses, means for rotating said rotatable means and said ring section at the same rate, and means for successively separating the nut elements with the distinguishing end feature engaging said complementary structure from said complementary structure, nut elements otherwise oriented previously falling gravitationally from said rotatable means.

12. The combination as set forth in claim 11 wherein the complementary structure comprises a plurality of arcuately spaced protuberances and the separating means comprises a knife edge in part overlying successive protuberances and adapted to engage beneath nut elements.

13. The combination as set forth in claim 11 wherein the complementary structure includes a plurality of arcuately spaced, longitudinally shiftable members, and the separating means comprises means for successively shifting said members longitudinally.

14. The combination as set forth in claim 13 wherein the means for successively shifting the members longitudinally comprises a cam of limited operative extent.

15. Apparatus for handling dissimilarly ended fastening elements comprising a pair of axially spaced apart rings coaxially mounted for rotation about an axis inclined to the vertical, the lowermost of said rings having a position which is higher than a position of the uppermost ring, the lowermost of said rings having a plurality of substantially radially extending grooves for picking up dissimilarly ended fastening elements from a random mass, the uppermost of said rings having means for retaining only such elements as are oriented in a predetermined direction, means for gravitationally transferring fastening elements substantially diametrically from the lowermost of said rings to the uppermost of said rings, such gravitational transfer being from the position of said lowermost ring which is above said position of uppermost ring to said position of uppermost ring.

References Cited in the file of this patent

UNITED STATES PATENTS

| | | |
|---|---|---|
| 233,062 | Barlow | Oct. 12, 1880 |
| 636,103 | Bartel | Oct. 31, 1899 |
| 1,739,422 | Schmidt | Dec. 10, 1929 |
| 1,859,101 | Lyons | May 17, 1932 |
| 1,897,116 | Friedman | Feb. 14, 1933 |
| 2,060,182 | Dellaree | Nov. 10, 1936 |
| 2,321,548 | Hanneman | June 8, 1943 |
| 2,327,401 | Chilton | Aug. 24, 1943 |
| 2,638,945 | Austin | May 19, 1953 |